(12) United States Patent
Beg

(10) Patent No.: US 9,667,069 B2
(45) Date of Patent: May 30, 2017

(54) ADAPTIVE LOAD SHARING OF PARALLEL INVERTERS SYSTEM

(75) Inventor: Mirza Akmal Beg, Pepperell, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 617 days.

(21) Appl. No.: 14/352,930

(22) PCT Filed: Oct. 21, 2011

(86) PCT No.: PCT/US2011/057248
§ 371 (c)(1),
(2), (4) Date: Apr. 18, 2014

(87) PCT Pub. No.: WO2013/058763
PCT Pub. Date: Apr. 25, 2013

(65) Prior Publication Data
US 2014/0239723 A1  Aug. 28, 2014

(51) Int. Cl.
| H02J 3/46 | (2006.01) |
| H02J 3/38 | (2006.01) |
| H02J 9/06 | (2006.01) |
| H02M 7/493 | (2007.01) |

(52) U.S. Cl.
CPC ............... *H02J 3/46* (2013.01); *H02J 3/383* (2013.01); *H02J 9/062* (2013.01); *H02M 7/493* (2013.01); *Y02B 10/72* (2013.01); *Y10T 307/555* (2015.04)

(58) Field of Classification Search
CPC ...... H02J 3/38; H02J 3/383; H02J 3/46; H02J 9/06; H02J 9/062; H02M 7/493; Y02B 10/72; Y10T 307/505; Y10T 307/555; Y10T 307/658; Y10T 307/675; Y10T 307/707
USPC ................ 307/44, 52, 53, 65, 72, 75, 76, 82
See application file for complete search history.

(56) References Cited

U.S. PATENT DOCUMENTS

| 5,194,757 | A | * | 3/1993 | Wertheim | ................. H02J 3/46 307/67 |
| 6,356,471 | B1 | | 3/2002 | Fang | |
| 6,768,295 | B2 | * | 7/2004 | Santin | ...................... H03F 1/30 307/52 |
| 2005/0073783 | A1 | | 4/2005 | Luo et al. | |
| 2009/0230772 | A1 | | 9/2009 | Caudill | |
| 2009/0273235 | A1 | * | 11/2009 | Ichikawa | ............ B60L 11/1851 307/9.1 |
| 2012/0153730 | A1 | * | 6/2012 | Barnett | ................. H02M 3/285 307/82 |

FOREIGN PATENT DOCUMENTS

| EP | 2071699 A2 | 6/2009 |
| JP | 2006 006045 A | 1/2006 |

OTHER PUBLICATIONS

International Search Report from corresponding PCT/US2011/057248 mailed Jul. 3, 2012.

* cited by examiner

*Primary Examiner* — Levi Gannon
(74) *Attorney, Agent, or Firm* — Lando & Anastasi, LLP

(57) ABSTRACT

According to one aspect, embodiments of the invention provide a method of operating a UPS system having a first UPS and a second UPS, the method comprising powering on the first UPS, receiving power from a first input power source coupled to an input of the first UPS, providing power to a load coupled to an output of the first UPS, adjusting the power provided to the load by the first UPS in response to power characteristics of the first UPS and power characteristics of the second UPS.

20 Claims, 10 Drawing Sheets

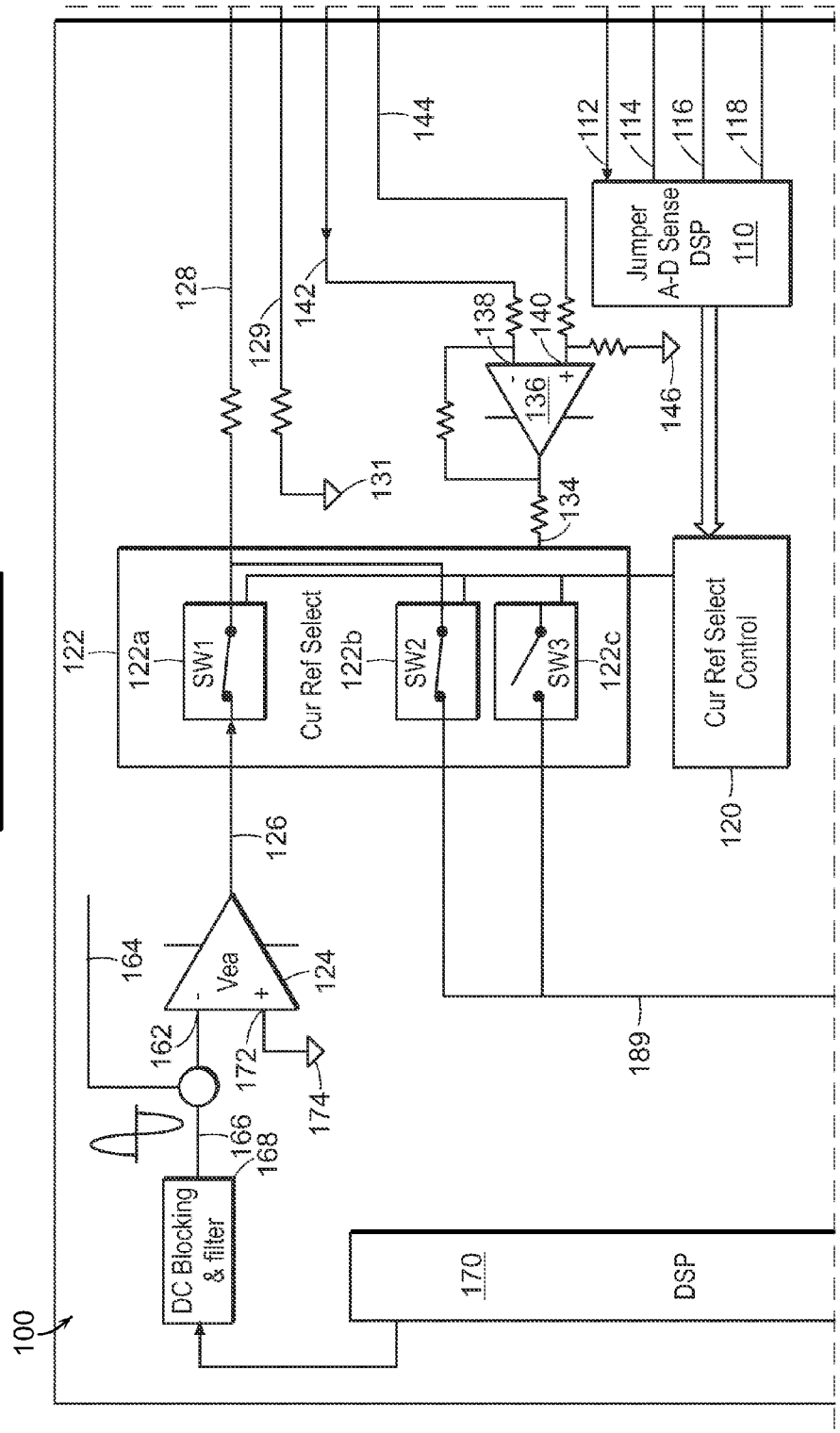

ADAPTIVE LOAD SHARING OF PARALLEL INVERTERS SYSTEM

This application is a National Stage Application under 35 U.S.C. §371 from PCT/US2011/057248, filed Oct. 21, 2011, which is hereby incorporated by reference in its entirety for all purposes.

BACKGROUND OF INVENTION

Field of the Invention

At least one example in accordance with the present invention relates generally to the parallel control of Uninterruptible Power Supplies.

Discussion of Related Art

Uninterruptible Power Supplies (UPS) are commonly used to provide regulated, uninterrupted power for sensitive and/or critical loads. There is an increased desire for UPS systems to provide greater capacity and/or reliability. For example, to provide enhanced scalability and/or redundancy, two UPS's may be electrically connected to form a single parallel UPS system with one output. In such a system, the combination of two UPS's may provide increased power capacity to a load attached to the parallel UPS system. Also, if a first one of the UPS's coupled in parallel fails, the second one of the UPS's coupled in parallel may backup for the failed UPS.

SUMMARY OF THE INVENTION

Aspects in accord with the present invention are directed to a method of operating a UPS system having a first UPS and a second UPS. According to one aspect, the method comprises powering on the first UPS, receiving power from a first input power source coupled to an input of the first UPS, providing power to a load coupled to an output of the first UPS, adjusting the power provided to the load by the first UPS in response to power characteristics of the first UPS and power characteristics of the second UPS.

According to one embodiment, adjusting the power provided to the load by the first UPS comprises adjusting a gain factor of the first UPS. In another embodiment, the method further comprises adjusting the gain factor based on power ratings of the first UPS and the second UPS. In one embodiment, the method further comprises adjusting the gain factor based on power capabilities of the first input power source and power capabilities of a second input power source providing power to the second UPS.

According to another embodiment, the first input power source is a battery having a capacity, and wherein adjusting the gain factor based on power capabilities comprises adjusting the gain factor based on the capacity of the battery. In another embodiment, the first input power source is a renewable energy source, and wherein adjusting the gain factor based on power capabilities comprises dynamically adjusting the gain factor based on changing power capabilities of the renewable energy source.

According to one embodiment, the method further comprises adjusting the gain factor based on power ratings of the first and second UPS, and adjusting the gain factor based on power capabilities of the first input power source and a second input power source providing power to the second UPS. In one embodiment, adjusting the gain factor based on the power ratings of the first UPS and the second UPS comprises adjusting a rating variable portion of the gain factor based on the power ratings of the first UPS and the second UPS. In another embodiment, adjusting the gain factor based on the power capabilities of the first and second input power sources comprises adjusting a dynamic variable portion of the gain factor based on the power capabilities of the first UPS and the second UPS.

According to another aspect, the present invention features a UPS comprising an input configured to receive input power from a first input power source, an output configured to provide output power to a load, the output power having an output current, a controllable gain stage coupled to the output and configured to adjust a gain factor of the UPS to adjust output current, and control circuitry coupled to the controllable gain stage and configured to adjust the gain factor of the gain stage based on power characteristics of the UPS and based on an input signal indicative of power characteristics of a second UPS also providing power to the load.

According to one embodiment, the gain factor of the gain stage is comprised of a rating variable portion and a dynamic variable portion. In one embodiment, the control circuitry is configured to adjust the rating variable portion of the gain factor based on a power rating of the UPS. In another embodiment, the control circuitry is configured to adjust the dynamic variable portion of the gain factor based on power capabilities of the first input power source.

According to another embodiment, the input is configured to be coupled to a battery and wherein the control circuitry is configured to adjust the dynamic variable portion of the gain factor based on a capacity of the battery. In another embodiment, the input is configured to be coupled to a renewable energy source and wherein the control circuitry is configured to dynamically adjust the dynamic variable portion of the gain factor based on changing capabilities of the renewable energy source.

According to one embodiment, the UPS further comprises an inverter configured to be coupled to the first input power source and the output and to regulate input power from the first input power source and provide regulated power to the output, a feedback loop coupled between the output and the gain stage, and a current error amplifier coupled between the gain stage and the inverter, wherein the current error amplifier is configured to provide control signals to the inverter based on a comparison between a current reference signal and an inverter current sense signal provided to the gain stage via the feedback loop and adjusted by the gain factor of the gain stage.

According to one aspect, the present invention features a UPS system comprising a first UPS and a second UPS, each of the first UPS and the second UPS including an input configured to receive input power from an input power source, an output configured to provide output power to a load, the output power having an output current, a controllable gain stage coupled to the output and configured to adjust the output current by a gain factor, and control circuitry coupled to the controllable gain stage and configured to adjust the gain factor of the gain stage in response to power characteristics of the first UPS and power characteristics of the second UPS.

According to one embodiment, the outputs of each UPS are coupled in parallel to the load and the output current of each UPS is combined to provide a total output current to the load, and wherein, by adjusting a ratio of the first UPS's gain factor to the second UPS's gain factor, the control circuitry of each UPS is further configured to adjust a percentage of total load current provided by each one of the UPS's.

According to another embodiment, the gain factor of each UPS comprises a rating variable portion which is defined based on a power rating of the first and the second UPS. In one embodiment, the gain factor of each UPS comprises a dynamic variable portion which is defined based on power capabilities of an input power source providing input power to the first UPS and an input power source providing input power to the second UPS.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1B:
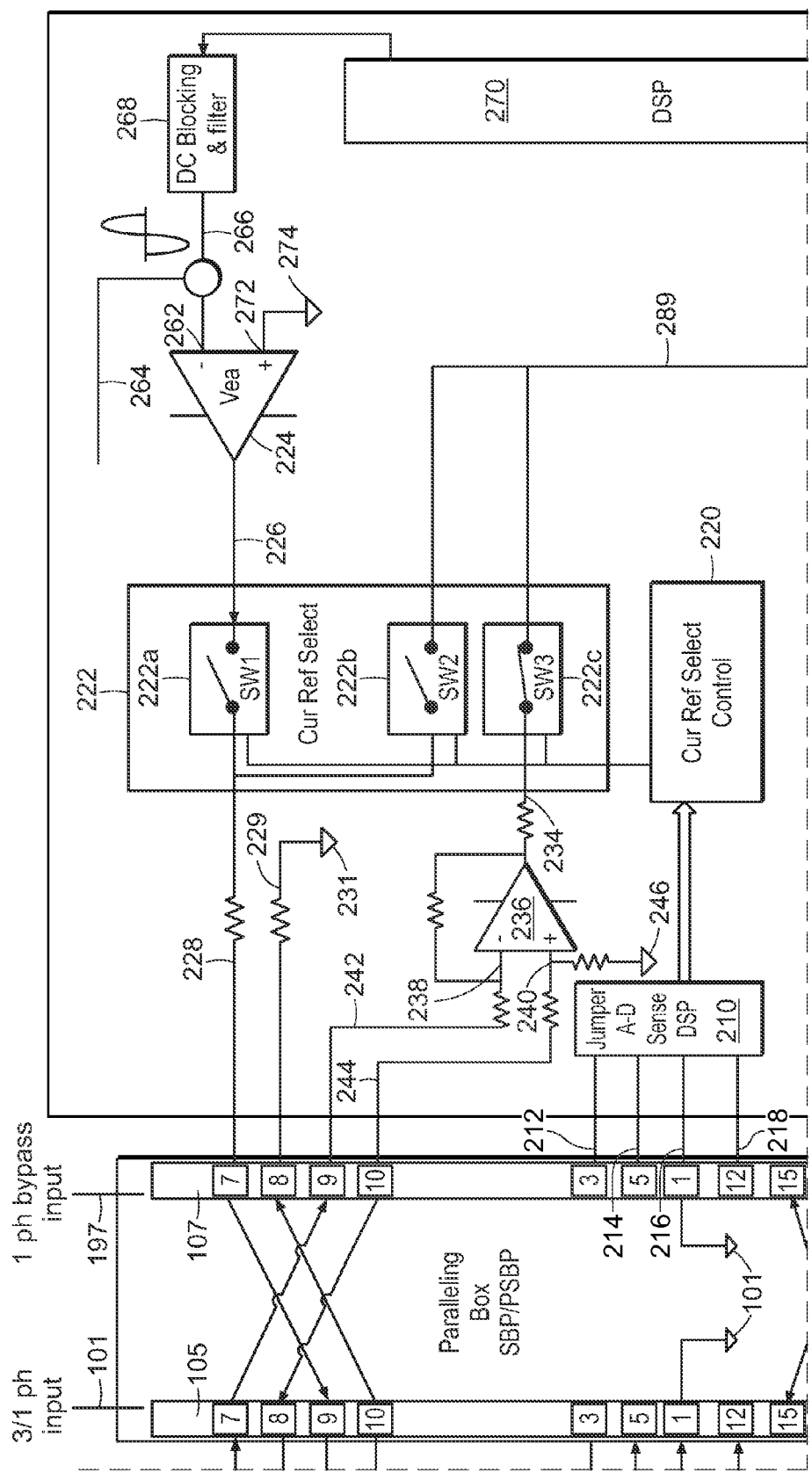
FIG. 1 is a circuit diagram of a parallel UPS system in accordance with aspects of the present invention including a first portion (FIG. 1A), second portion (FIG. 1B), third portion (FIG. 1C) and fourth portion (FIG. 1D)

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, to provide enhanced scalability and/or redundancy, two UPS's may be electrically connected to form a single parallel UPS system with one output configured to be coupled to a load. In some parallel UPS systems, two UPS's having different capabilities may be coupled in parallel. For example, the two UPS's may have different power ratings or may be coupled to two different power sources (e.g., to batteries with different capacities or to different types of renewable energy sources with different power capabilities). In such a parallel UPS system, where the two UPS's have different power characteristics, sharing a load equally between the two UPS's may result in reduced efficiency and performance of the system.

For example, when an external power source is either unavailable or inadequate and the UPS's are operating in battery mode, if the two batteries providing power to the UPS's have different capacities, then sharing the load equally between the two UPS's will drain the lower capacity battery and force the UPS with the higher capacity battery to provide all of the required power to the load. The higher capacity battery may not be able to provide the required power by itself or may not be able to provide the required power for the desired length of time.

In another example, where one UPS is operating from power provided by a first type of renewable power source (e.g., a solar panel or wind turbine), and a second UPS is operating from power provided by a second type of power source (e.g., a generator or utility power source), changing environmental conditions may suddenly alter the capabilities of the first type of power source, placing sudden added burden on the second type of power source. The second type of power source may not be able to handle the added power requirements of the load and this may result in an abrupt load drop.

At least some embodiments described herein provide a parallel UPS system capable of dynamically adjusting the load sharing of each UPS in the parallel UPS system based on power characteristics of each UPS such as power rating, available battery capacity and/or the power capabilities of each UPS's input power source. In this way, the runtime of each UPS in the parallel UPS system may be optimized and abrupt changes in load requirements (e.g., where one UPS is suddenly unable to provide its share of power) may be avoided. Also, where a renewable input energy source is providing power to a UPS, the parallel UPS system can adjust load sharing to optimize the power drawn from the renewable source.

Figure 1C:
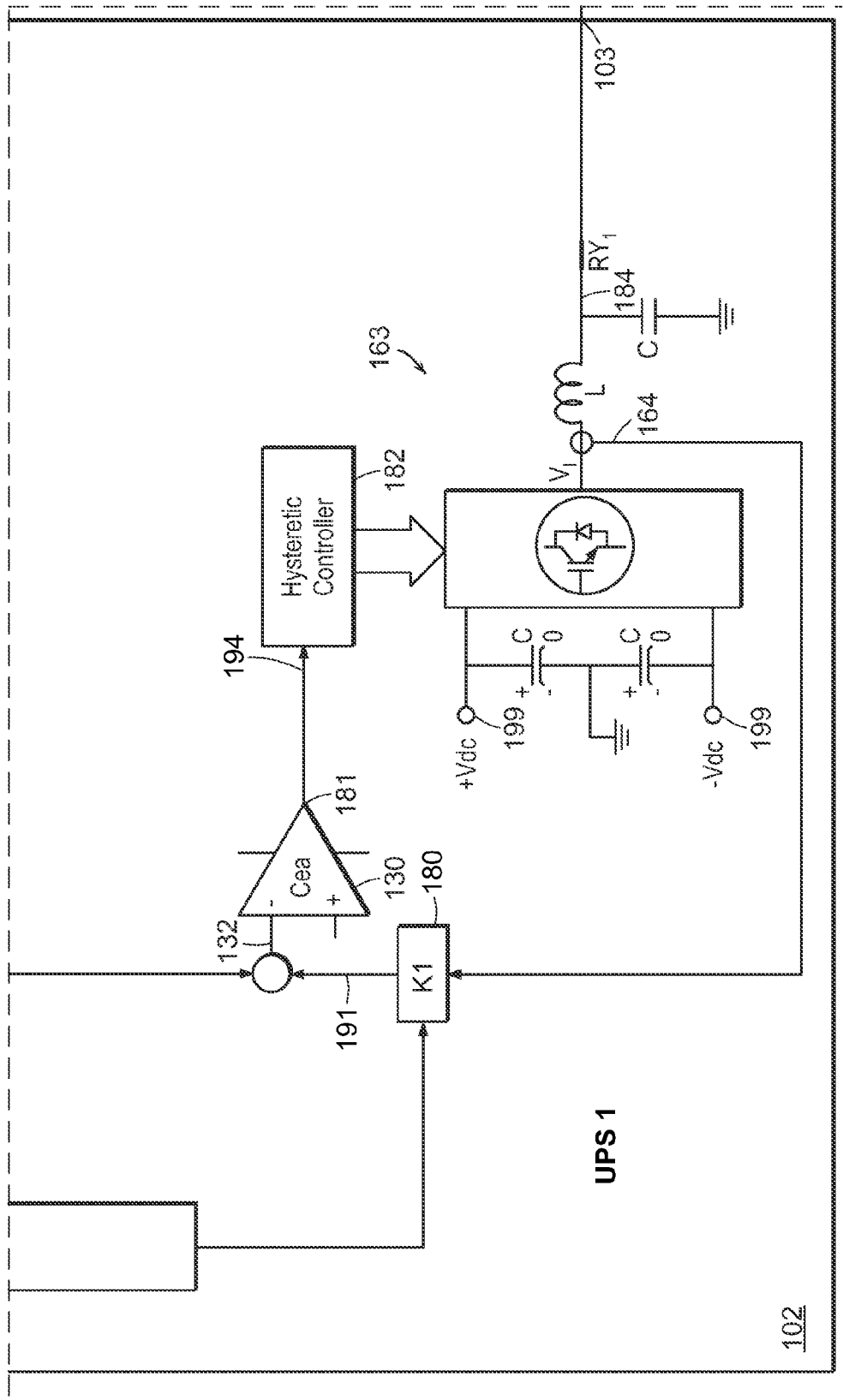
Figure 1D:
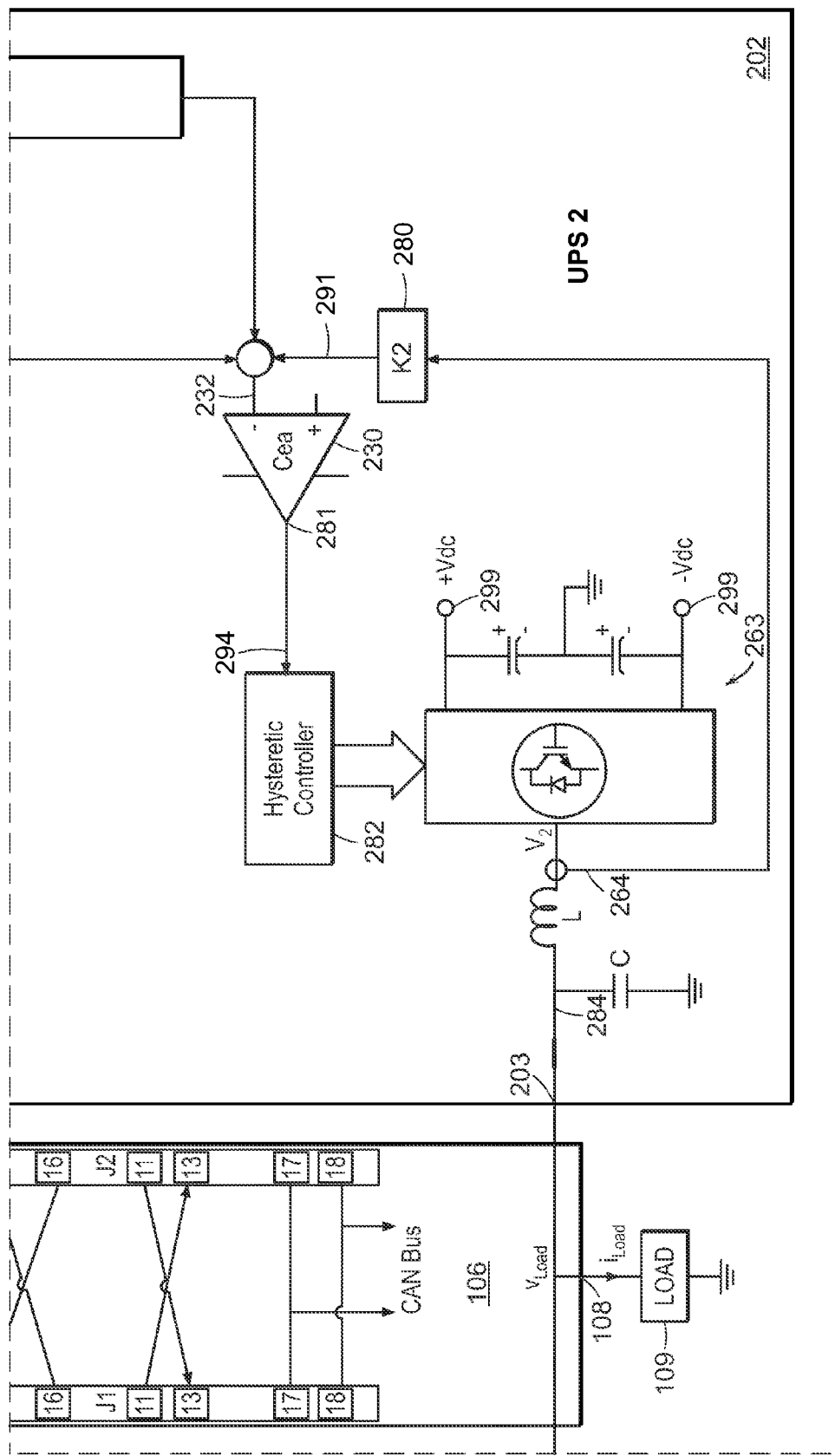

FIG. 1 is a circuit diagram of a parallel UPS system 100 in accordance with aspects of the present invention. FIG. 1 includes a first upper-left portion shown in FIG. 1A, a second upper-right portion shown in FIG. 1B, a third lower-left portion shown in FIG. 1C and a fourth lower-right portion shown in FIG. 1D. The parallel UPS system 100 includes a first UPS 102 and a second UPS 202. Both the first UPS 102 and the second UPS 202 are configured to be coupled in parallel via a connection module 106 (e.g. an SBP (Service Bypass Panel) or PSBP (Parallel Service Bypass Panel)). According to one embodiment, the connection module 106 includes a first input 101 configured to be coupled to an external power source. The external power source may be a single or three-phase power source. The connection module 106 also includes a second input 197 configured to be coupled to a bypass external power source, however, in other embodiments, the bypass power source may be a three phase source. In one embodiment, the bypass external power source is a single phase power source. In one embodiment, both the first input 101 and the second input 197 may be coupled to the same single phase or three phase power source.

The connection module 106 is coupled to an output 103 of the first UPS 102 and an output 203 of the second UPS 202. An output 108 of the connection module 106 is coupled to both the first UPS output 103 and the second UPS output 203. The output 108 is also coupled to an external load 109. The connection module 106 functions to provide power to each UPS, receive output power from each UPS, and provide output power to one or more loads.

The specific components of the first UPS 102 will now be described in greater detail. The first UPS 102 is substantially the same as the second UPS 202 and like components are labeled using similar reference numbers, except that reference numbers for components of the first UPS start with the number one and reference numbers for components of the second UPS start with the number two.

The first UPS 102 includes a master/controlled detection circuit 110 coupled to a current reference select control circuit 120. The current reference select control circuit 120 is also coupled to a current reference select switch bank 122. The current reference select switch bank 122 is coupled to a Voltage error amplifier (Vea) 124 and a Current error amplifier (Cea) 130. The Vea 124 is coupled to a Digital Signal Processor (DSP) 170 via a DC blocking and filter circuit 168 and an inverter 163. The negative input terminal 132 of the current error amplifier (Cea) 130 is coupled to a DSP controlled gain stage 180. The DSP controlled gain stage 180 is coupled to the DSP 170 and to an inverter sense line 164 from the inverter 163. The output 181 of the Cea 130 is coupled to an inverter controller 182 and the inverter controller 182 is coupled to the inverter 163. The inverter is coupled to a ±DC bus 199 and to an output 103 of the UPS 102.

The master/controlled detection circuit 110 is configured to receive four jumper sense signals via four jumper sense Input/Output's (I/O's) (e.g., A sense 112, B sense 114, C sense 116, and D sense 118) coupled to the connection module 106. As described herein, the master/controlled detection circuit 110 receives four jumper sense signals from four jumper sense I/O's; however, in other embodiments, the master/controlled detection circuit may be configured to receive any number of jumper sense signals from any number of jumper sense I/O's. Upon the first UPS 102 being coupled to the connection module 106 via a first connector 105 and the second UPS 202 being coupled to the connection module 106 via a second connector 107, the B sense I/O 114 is coupled to the A sense I/O 212 and both C sense I/O's 116, 216 are coupled to ground.

The current reference select switch bank 122 includes three switches (e.g., SW1 122*a*, SW2 122*b* and SW3 122*c*), each coupled to the current reference select control circuit 120. However, in other embodiments, the current select switch bank 122 may include any number of switches. SW1 122*a* is coupled between the output 126 of the voltage error amplifier (Vea) 124 and a primary bus transmit I/O 128. When SW1 112*a* is closed, the output 126 of the Vea 124 is coupled to the primary bus transmit I/O 128. The first UPS 102 also includes a primary bus transmit return I/O 129 which is coupled to ground 131.

SW2 122*b* is coupled between the negative input terminal 132 of the current error amplifier (Cea) 130 and the primary bus transmit I/O 128. When SW2 122*b* is closed, the negative input terminal 132 of the Cea 130 is coupled to the primary bus transmit I/O 128. SW3 122*c* is coupled between the output 134 of an amplifier 136 and the negative input terminal 132 of the Cea 130. When SW3 122*c* is closed, the output 134 of the amplifier 136 is coupled to the negative input terminal 132 of the Cea 130. The negative input terminal 138 of the amplifier 136 is coupled to the output 134 of the amplifier 136 and a primary bus receive I/O 142. The positive input terminal 140 of the amplifier 136 is coupled to a primary bus receive return I/O 144 and to ground 146.

Upon the first UPS 102 being coupled to the connection module 106 via the first connector 105 and the second UPS 202 being coupled to the connection module 106 via the second connector 107, the primary bus transmit I/O 128 is coupled to the primary bus receive I/O 242, the primary bus transmit return I/O 129 is coupled to the primary bus receive return I/O 244, the primary bus receive I/O 142 is coupled to the primary bus transmit I/O 228, and the primary bus receive return I/O 144 is coupled to the primary bus transmit return I/O 229.

According to one embodiment, the primary bus transmit I/O 128 is configured to provide a PRIM_BUS_TX signal from the output 126 of the Vea 124 to the second UPS 202. According to one embodiment, the primary bus receive I/O 142 is configured to receive a PRIM_BUS_RX signal from the second UPS 202 and provide the PRIM_BUS_RX signal to the Cea 130.

The negative input terminal 162 of the Vea 124 is also coupled to the inverter sense line 164 from the inverter 163 and to the DSP 170 via the DC blocking and filtering circuit 168. The positive input terminal 172 of the Vea 124 is coupled to ground 174.

The output 181 of the Cea 130 is coupled to the inverter controller 182. According to one embodiment, the inverter controller 182 is a hysteretic controller; however, in other embodiments the inverter controller 182 may be any known controller scheme. The controller 182 is coupled to the inverter 163 and the output 184 of the inverter is coupled to the load 109 via the output 103 of the first UPS 102 and the output 108 of the connection module 106.

The parallel UPS system 100 operates by using a master/controlled UPS approach where one UPS is designated as the master UPS and the other UPS is designated as the controlled UPS. The master UPS is responsible for overall control of the power provided to the load 109 and any controlled UPS acts as a current source inverter and shares the load current as demanded by the master UPS. In one embodiment, either UPS can act as a master or controlled UPS, and the UPS's can dynamically change their designation as master or controlled if required; however, only one UPS may be designated as master at any given time.

Upon coupling the first UPS 102 to the connection module 106 via the first connector 105 and coupling the second UPS 202 to the connection module 106 via the second connector 107, each UPS 102, 202 utilizes the jumper sense signals received via the jumper sense Input/Output's (I/O's) (e.g., A sense 112, B sense 114, C sense 116, and D sense 118) to make an individual determination whether it is configured as a master or controlled UPS and to which connector 105, 107 the UPS is connected.

As shown in FIG. 1, each UPS 102, 202 is capable of monitoring four jumper sense signals via the jumper sense Input/Output's (I/O's) (e.g., A sense 112, B sense 114, C sense 116, and D sense 118). The configuration of the jumper sense signals determines whether a UPS will operate as a master or controlled UPS. According to one embodiment, the jumper sense signals are detected by the master/controlled detection circuit 110 (e.g., a DSP or Complex Programmable Logic Device (CPLD)) upon the UPS's being coupled to the connection module 106 and the parallel UPS system 100 powering up. Based on these sense signals, each UPS 102, 202 will individually determine its own assigned configuration.

For example, master/controlled UPS determination may be performed based on the sense signals as described in U.S. patent application Ser. No. 13/235,636 entitled "PARALLEL CONTROL AND PROTECTION FOR UPS", filed on Sep. 19, 2011, which is herein incorporated by reference in its entirety.

According to one embodiment, both UPS's share a common current reference signal called PRIM_BUS and each UPS utilizes two differential control analog signals, PRIM_BUS_TX and PRIM_BUS_RX to provide or receive the PRIM_BUS signal. The PRIM_BUS_TX and PRIM_

BUS_RX differential control analog signals are transmitted or received via the corresponding primary bus transmit and receive I/O's 128, 142, 228, 242 within each UPS. The primary bus transmit I/O 128, 228 of one UPS is connected to the primary bus receive I/O 142, 242 of the other UPS. The UPS that uses the PRIM_BUS_TX signal for inverter control is considered the master UPS, while the UPS that uses PRIM_BUS_RX for inverter control is considered the controlled UPS. The selection of either PRIM_BUS_TX or PRIM_BUS_RX by a UPS as the appropriate control signal depends on the state (i.e. the state of the jumper sense signals) of each UPS.

As described previously, each UPS 102, 202 has its own Vea 124, 224, Cea 130, 230, and single pole analog switch bank 122. Each Vea 124, 224 receives an inverter voltage sense signal via the inverter sense line 164, 264 from the inverter 163, 263. Each Vea also receives a reference voltage signal 166, 266 from the DSP 170, 270 via the DC blocking and filter circuit 168, 268. Each Vea 124, 224 compares the inverter voltage sense signal with the voltage reference signal and generates a voltage error signal at the output 126, 226 of the Vea 124, 224. The output 126, 226 of the Vea 124, 224 can be coupled to the primary bus transmit I/O 128, 228 through switch SW1 122a, 222a and the voltage error signal can be provided to the primary bus transmit I/O 128, 228 as the PRIM_BUS_TX signal. The signal input to the Cea 130, 230 (i.e. the current reference signal 189, 289) is taken either from the PRIM_BUS_TX signal via switch SW2 122b, 222b or from the PRIM_BUS_RX signal via the output 134 of the amplifier 136 and switch SW3 122c, 222c, depending on whether the UPS 102, 202 is designated as the master or controlled UPS.

The DSP controlled gain stage 180, 280 receives an inverter current sense signal from the inverter 163, 263 via the inverter sense line 164, 264 and provides a gain adjusted inverter current sense signal 191, 291 (i.e. the inverter current sense signal adjusted by gain factor K1 or K2 respectively) to the Cea 130, 230. The gain factor of the DSP controlled gain stage 180, 280 is controlled through signals from the DSP 170, 270. According to one embodiment, the DSP controlled gain stage 180, 280 is a variable gain amplifier; however, in other embodiments, the DSP controlled gain stage 180, 280 may be implemented using any known techniques for both analog and digital control of inverters.

The Cea 130, 230 receives the current reference signal 189, 289 from the switch bank 122. Based on a comparison of the current reference signal 189, 289 and the gain adjusted inverter current sense signal 191, 291, the Cea 130, 230 provides a current error signal 194, 294 to the inverter controller 182, 282 via the output 181, 281 of the Cea 130, 230.

According to one embodiment, AC power supplied by the external power source to the input 101 is converted to DC power (e.g., via a Power Factor Correction circuit (not shown)) and supplied to the ±DC bus 199. Based on the current error signal 194, 294 the inverter controller 182, 282 sends control signals to the inverter 163, 263 to convert the DC power back into regulated AC power. As a result, the inverter 163, 263 provides properly regulated AC power to the load 109 from the output 184, 284 of the inverter 163, 263.

In another embodiment, where appropriate power from the external power source is not available at the first input 101, the inverter 163, 263 receives DC power from a battery (not shown) coupled to the ±DC bus 199. Based on the current error signal 194, 294 the inverter controller 182, 282 sends control signals to the inverter 163, 263 to convert the DC power from the battery into regulated AC power. As a result, the inverter 163, 262 provides properly regulated AC power to the load 109 from the output 184, 284 of the inverter 163, 263.

The operation of the switch bank 122, 222 (and hence the operational mode of each UPS and operation of the parallel UPS system 100) depends on the configuration of each UPS (i.e. the jumper status of each UPS in the parallel UPS system 100). For example, according to one embodiment, when the first UPS 102 is defined as the master UPS and the second UPS 202 is defined as the controlled UPS (i.e. in response to the jumper sense signals), switches SW1 122a, SW2 122b, and SW3 222c are closed and switches SW3 122c, SW1 222a, and SW2 222b are open. The voltage error signal at the output 126 of the Vea 124 is provided to the primary bus transmit I/O 128 as the PRIM_BUS_TX signal via switch SW1 122a. The PRIM_BUS_TX signal is provided to the Cea 130 as the current reference signal 189 via switch SW2 122 b. The PRIM_BUS_TX signal is also provided to the primary bus receive I/O 242 as the PRIM_BUS_RX signal. The PRIM_BUS_RX signal is provided, as the current reference signal 289, to the Cea 230, via the amplifier 236 and switch SW3 222c.

In another example, when the first UPS 102 is configured as the controlled UPS and the second UPS 202 is configured as the master UPS, switches SW1 122a, SW2 122b, and SW3 222c are opened while switches SW3 122c, SW1 222a, and SW2 222b are closed. In this configuration, the voltage error signal at the output 226 of the Vea 224 is provided to the primary bus transmit I/O 228 as the PRIM_BUS_TX signal via switch SW1 222a. The PRIM_BUS_TX signal is provided to the Cea 230 as the current reference signal 289 via switch SW2 222b. The PRIM_BUS_TX signal is also provided to the primary bus receive I/O 142 as the PRIM_BUS_RX signal. The PRIM_BUS_RX signal is provided, as the current reference signal 189, to the Cea 130, via the amplifier 136 and switch SW3 122c.

Figure 2:
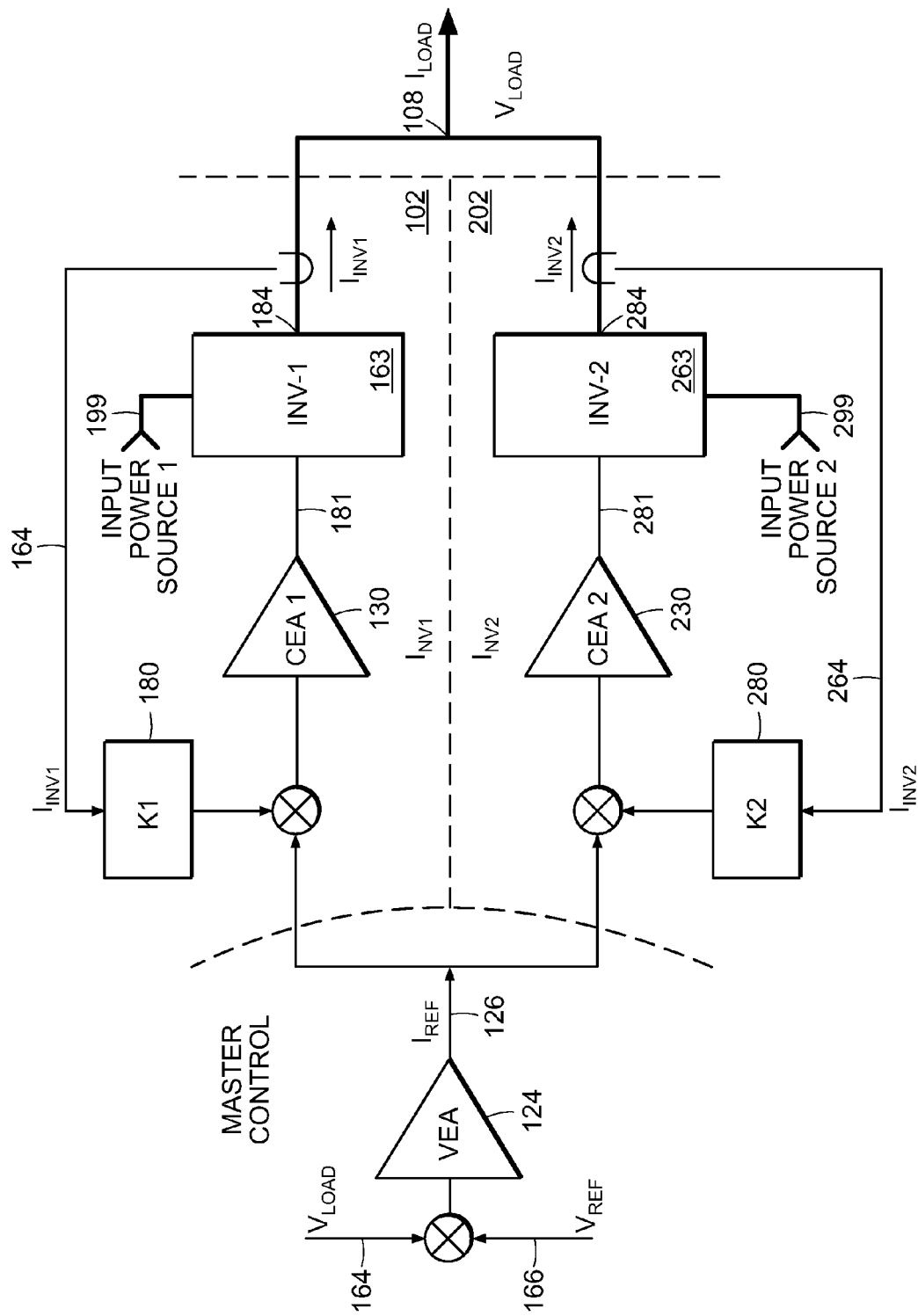
FIG. 2 is a block diagram of a parallel UPS system in accordance with aspects of the present invention.

Upon making the master/controlled UPS determination and configuring each UPS to operate according to its designated state of operation, the parallel UPS system 100 dynamically adjusts the load sharing of each UPS 102, 202 to account for changing UPS capabilities, as shown in FIG. 2.

FIG. 2 is a block diagram of a parallel UPS system in accordance with aspects of the present invention. As shown in the embodiment illustrated in FIG. 2, the first UPS 102 has been designated the master UPS and the second UPS 202 has been designated the controlled UPS. The output 126 of the Vea 124 of the first UPS 102 is coupled to the Cea 130 of the first UPS 102 and the Cea 230 of the second UPS 202. The output 181 of the Cea 130 is coupled to the inverter 163 and the output 281 of the Cea 230 is coupled to the inverter 263. The inverter 163 is coupled to a ±DC bus 199 which is coupled to a first input power source and the inverter 263 is coupled to a ±DC bus 299 which is coupled to a second input power source. The output 184 of the inverter 163 and the output 284 of the inverter 263 are both coupled to the output 108 of the connection module 106 which is coupled to an external load. The controlled gain stage 180 is coupled to the output 184 of the inverter 163 via an inverter sense line 164 and the controlled gain stage 280 is coupled to the output 284 of the inverter 263 via an inverter sense line 264.

The Vea 124 receives a reference voltage signal 166 from the DSP 170 and an inverter voltage sense signal from the inverter 163, via the inverter sense line 164. Based on a comparison of the inverter voltage sense signal and the reference voltage signal 166, the Vea 120 generates a voltage error signal at its output 126. As described above, because the first UPS 102 is designated as the master UPS, it provides the voltage error signal to both the Cea 130 of the first UPS 102 and the Cea 230 of the second UPS 202.

The DSP controlled gain stage 180 receives an inverter current sense signal ($I_{INV1}$) from the output 184 of the inverter 163 via the inverter sense line 164. The DSP controlled gain stage 180 adjusts the inverter current sense signal by the gain factor K1 and provides the gain adjusted inverter current sense signal to the Cea 130. Based on a comparison of the voltage error signal from the Vea 124 and the adjusted inverter current sense signal from the DSP controlled gain stage 180, the Cea 130 provides a current error signal to the inverter 163. Based on the current error signal, the inverter 163 is controlled to regulate and convert the DC power provided to the ±DC bus 199 from the first input power source to provide AC power (having current $I_{INV1}$) to the output 108.

The DSP controlled gain stage 280 receives an inverter current sense signal ($I_{INV2}$) from the output 284 of the inverter 263 via the inverter sense line 264. The DSP controlled gain stage 280 adjusts the inverter current sense signal by the gain factor K2 and provides the gain adjusted inverter current sense signal to the Cea 230. Based on a comparison of the voltage error signal from the Vea 124 (i.e. from the master first UPS 102) and the adjusted inverter current sense signal from the DSP controlled gain stage 280, the Cea 230 provides a current error signal to the inverter 263.

Based on the current error signal, the inverter 263 is controlled to regulate and convert the DC power provided on the ±DC bus 299 from the second input power source to provide AC power (having current $I_{INV2}$) provided to the output 108. Current $I_{INV1}$ and $I_{INV2}$ are combined to provide a total current $I_{Load}$ to the output 108.

As described herein with regards to FIG. 2, the first UPS 102 is designated the master UPS; however, in other embodiments, where the second UPS 202 is designated the master UPS, the voltage error signal provided to the Cea 130 and Cea 230 would originate from the Vea 224 in the second UPS 202, rather than the Vea 124 in the first UPS 102.

According to one embodiment, load sharing between the first UPS 102 and the second UPS 202 (i.e. the percentage of total load current provided by each UPS) is a function of the ratio of K1 to K2. For example, if the voltage error signal at the output 126 of the Vea 124 has current defined as $I_{REF}$:

$$I_{REF}=K1*I_{INV1}=K2*I_{INV2};$$

$$I_{Load}=I_{INV1}+I_{INV2};$$

$$K1/K2=I_{INV2}/I_{INV1}=I_{Load}/I_{INV1}-1=100/(\% \text{ Load Share by } I_{INV1})-1;$$

$$I_{INV1}=I_{Load}*(1/((K1/K2)+1))$$

$$I_{INV2}=I_{Load}*(1/((K2/K1)+1))$$

The ratio K1/K2 defines the load sharing relationship between the first UPS 102 and the second UPS 202 and the percentage of the total current provided by each inverter 163, 263 to the load. According to one embodiment, the DSP 170, 270 of each UPS 102, 202 controls the gain factor of its associated gain stage 180, 280 in order to define the K1/K2 ratio.

Figure 3:
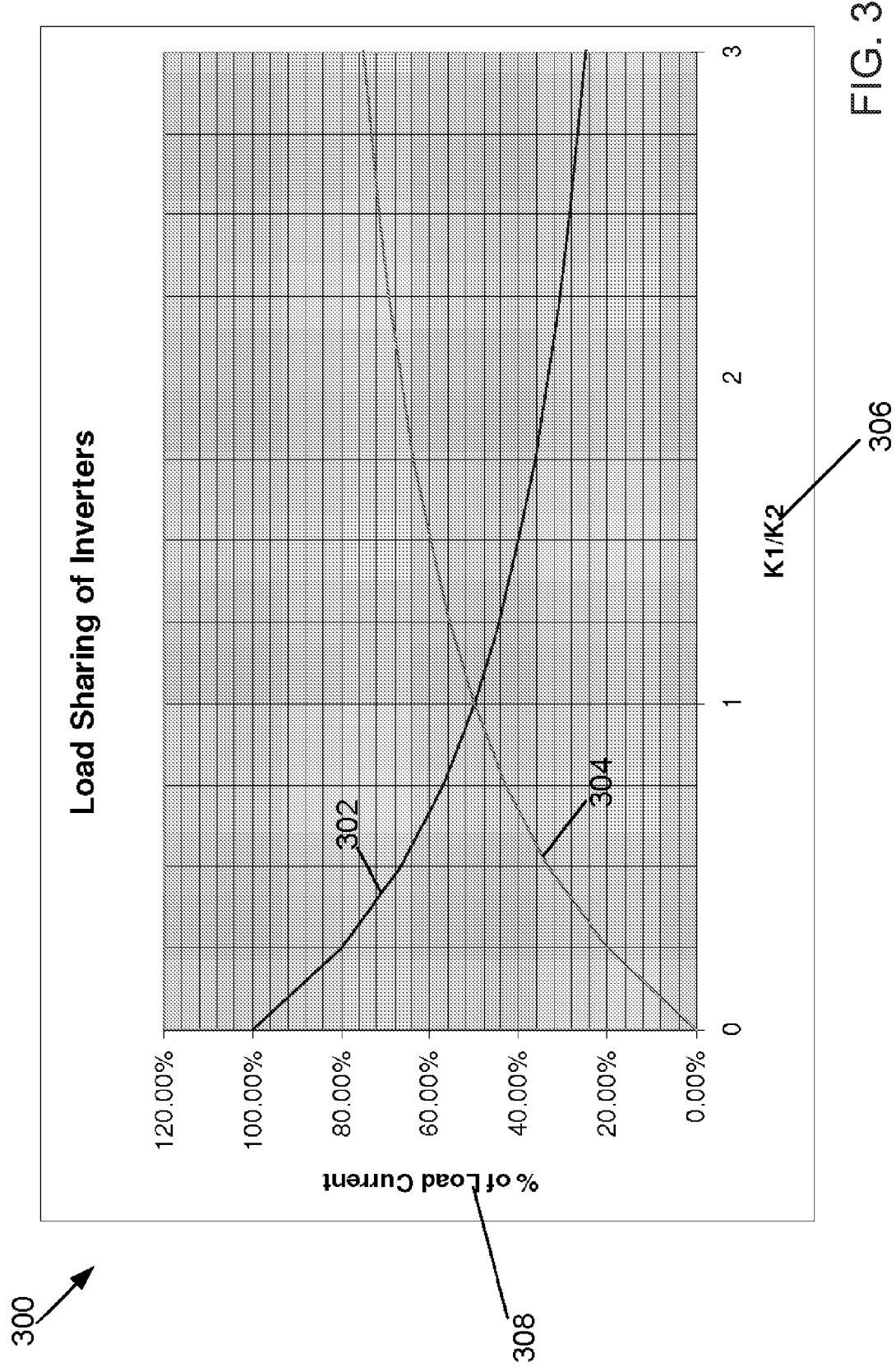
FIG. 3 is a graphical illustration of the load sharing of two inverters as a function of K1/K2 in accordance with aspects of the present invention.

A graphical representation 300 of the load sharing relationship between the first UPS 102 and the second UPS 202 as a function of K1/K2 is illustrated in FIG. 3. As shown in FIG. 3, a curve representing current $I_{INV1}$ 302 from the first UPS 102 and a curve representing current $I_{INV2}$ 304 from the second UPS 202 are shown. The x-axis 306 of the graph 300 represents the value of the ratio K1/K2 and the y-axis 308 of the graph 300 represents the percentage of total load current ($I_{Load}$) provided by each inverter 163, 263 in response to the K1/K2 ratio.

When ratio K1/K2 is one, both the current $I_{INV1}$ from the first UPS 102 and the current $I_{INV2}$ from the second UPS 202 provide fifty percent of the total load current ($I_{Load}$). In another example, when ratio K1/K2 is two, the current $I_{INV1}$ from the first UPS 102 provides one third of the total load current ($I_{Load}$) and the current $I_{INV2}$ from the second UPS 202 provides two thirds of the total load current ($I_{Load}$). Finally, in another example, when ratio K1/K2 is three, the current $I_{INV1}$ from the first UPS 102 provides one quarter of the total load current ($I_{Load}$) and the current $I_{INV2}$ from the second UPS 202 provides three quarters of the total load current ($I_{Load}$). By dynamically adjusting the K1/K2 ratio, the DSP 170, 270 configures the load sharing relationship of the first UPS 102 and the second UPS 202 to compensate for limited or changing input power source capabilities.

For example, when the first input power source providing power to the inverter 163 is the same as the second input power source providing power to the inverter 263 (e.g., from a utility power source providing the same power to both UPS's 102, 202 through input 101), the DSP's 170, 270 configure the gains of their associated gain stages 180, 280 to be equal, causing the ratio K1/K2 to equal 1, and the percentage of total load power provided by each UPS 102, 202 to also be equal. Where the power provided to each UPS 102, 202 is the same, but the rating of each UPS 102, 202 is different, the K1/K2 ratio is adjusted to configure the load sharing relationship between the first UPS 102 and the second UPS 202 to prevent a UPS from being overloaded. For instance, if the first UPS 102 has a 20 kW rating and the second UPS 202 has a 10 kW rating, the K1/K2 ratio is adjusted appropriately so that a higher percentage of the total load current is provided by the higher rated first UPS 102. In this way, the lower rated second UPS 202 is prevented from overloading and failing, resulting in the first UPS 102 having to fully support the load at the output 108.

In another example, the power provided by the utility power source through input 101 may be inadequate to power the load at the output 108. Consequently, the UPS's 102, 202 may operate in battery mode, with each UPS 102, 202 receiving input power from a different battery. In one embodiment, where each battery has a different capacity, the K1/K2 ratio is adjusted to configure the load sharing relationship between the first UPS 102 and the second UPS 202 to prevent a battery from becoming quickly exhausted. For instance, if a first battery providing power to the first UPS 102 has a lower capacity than a second battery providing power to the second UPS 202, then the K1/K2 ratio is adjusted appropriately so that a higher percentage of the total load current is provided by the second UPS 202 and the higher capacity battery. In this way, the runtime of the first UPS 102 may be extended, preventing the second UPS 202 from having to support the entire load. According to one embodiment, when at least one UPS 102, 202 is operating in battery mode, the ratio K1/K2 is updated frequently as changes in input power status may occur suddenly. Also in battery mode, the ratio K1/K2 may be updated frequently based on remaining capacity of each battery.

In another example, power may be provided by a first type of renewable power source (e.g., a wind turbine) to the first UPS 102 and by a second type of renewable power source (e.g., a solar panel) to the second UPS 202. Due to changing environmental conditions, the different types of renewable power sources may be capable of providing different levels of power at different times. In such a configuration, the K1/K2 ratio is dynamically adjusted to account for the different input power sources and changing input power source capabilities, to prevent a UPS from becoming overloaded. For instance, if at a first time, the renewable input power source coupled to the first UPS 102 is not capable of providing as much power as the renewable input power source coupled to the second UPS 202, then the K1/K2 ration is adjusted appropriately so that the higher percentage of the total load current is provided by the second UPS 202. If at a second time, the renewable input power source coupled to the second UPS 102 is not capable of providing as much power as the renewable input power source coupled to the first UPS 202, then the K1/K2 ration is adjusted appropriately so that the higher percentage of the total load current is provided by the first UPS 202. In this way, UPS overloads may be prevented and the parallel UPS system 100 may be more efficient. The ratio K1/K2 may also be adjusted based on a relative cost of power of two power supplies to reduce overall cost of the power draw.

According to one embodiment, in addition to monitoring the power capabilities and status of its associated UPS, each DSP 170, 270 also communicates with the other UPS coupled in parallel in order to send information regarding its power capabilities and status and receive information regarding the other UPS's power capabilities and status. In this way, each DSP 170, 270 can be informed of external limitations of the other UPS's and in response, can accurately adjust the gain factor of its gain stage 180, 280 to set the appropriate ratio K1/K2 based on the capabilities of the entire parallel UPS system 100. According to one embodiment, the DSP's 170, 270 communicate via a CAN bus coupled between the UPS's 102, 202; however, in other embodiments, the DSP's may communicate via any known communication method.

According to one embodiment, each gain factor (K1 and K2) may be based on more than one variable. For example, in one embodiment, each gain factor is comprised of two parts, a rating variable and a dynamic variable, where the gain factor is equal to the rating variable multiplied by the dynamic variable. For example, the gain factor K1 equals the rating variable of the gain stage 180 ($K1_R$) multiplied by the dynamic variable of the gain stage 180 ($K1_D$) and the gain factor K2 equals the rating variable of the gain stage 280 ($K2_R$) multiplied by the dynamic variable of the gain stage 280 ($K2_D$).

The rating variable of a gain stage 180, 280 is defined, by the DSP 170, 270, in response to design capabilities of the corresponding UPS 102, 202. For example, the rating variable of a gain stage 180, 280 may be based on the power rating of the UPS 102, 202. In one embodiment, the power rating of the UPS 102, 202 is measured by the DSP 170, 270. In another embodiment, the power rating of the UPS 102, 202 is determined by the DSP 170, 270 in reference to the model number of the UPS 102, 202 or the inverter 163, 263. In another embodiment, the power rating of the UPS 102, 202 is programmed into the DSP 170, 270 at the time of installation. Based on the power rating of the UPS 102, 202, the DSP 170, 270 sets the rating variable of the corresponding gain factor.

As the rating variable of each gain factor is based on the design capabilities of each UPS 102, 202, the rating variables automatically adjust each gain factor to compensate load sharing between the UPS's 102, 202 to account for differing power ratings between the two UPS's 102, 202. If two UPS's 102, 202 with different ratings are receiving input power from the same source (e.g., via input 101) or from two sources with the same capabilities, only the rating variable of each gain factor need be adjusted to compensate load sharing between the UPS's to account for the differing power ratings. In such a situation the dynamic variables would equal one and would not affect the ratio K1/K2.

For example, in a parallel UPS system where two UPS's are receiving power from input sources having the same capabilities (e.g., from the same input utility source):

$$K1=K1_R*K1_D \text{ and } K2=K2_R*K2_D;$$

$$K1_D=K2_D=1;$$

$$I_{INV1}=I_{Load}*(1/((K1_R/K2_R)+1)); \text{ and}$$

$$I_{INV2}=I_{Load}*(1/((K2R/K1_R)+1)).$$

The ratio $K1_R/K2_R$ (i.e. the ratio of rating variables) defines the load sharing relationship between the first UPS 102 and the second UPS 202 and the percentage of the total current provided by each inverter 163, 263 to the load.

Figure 4:
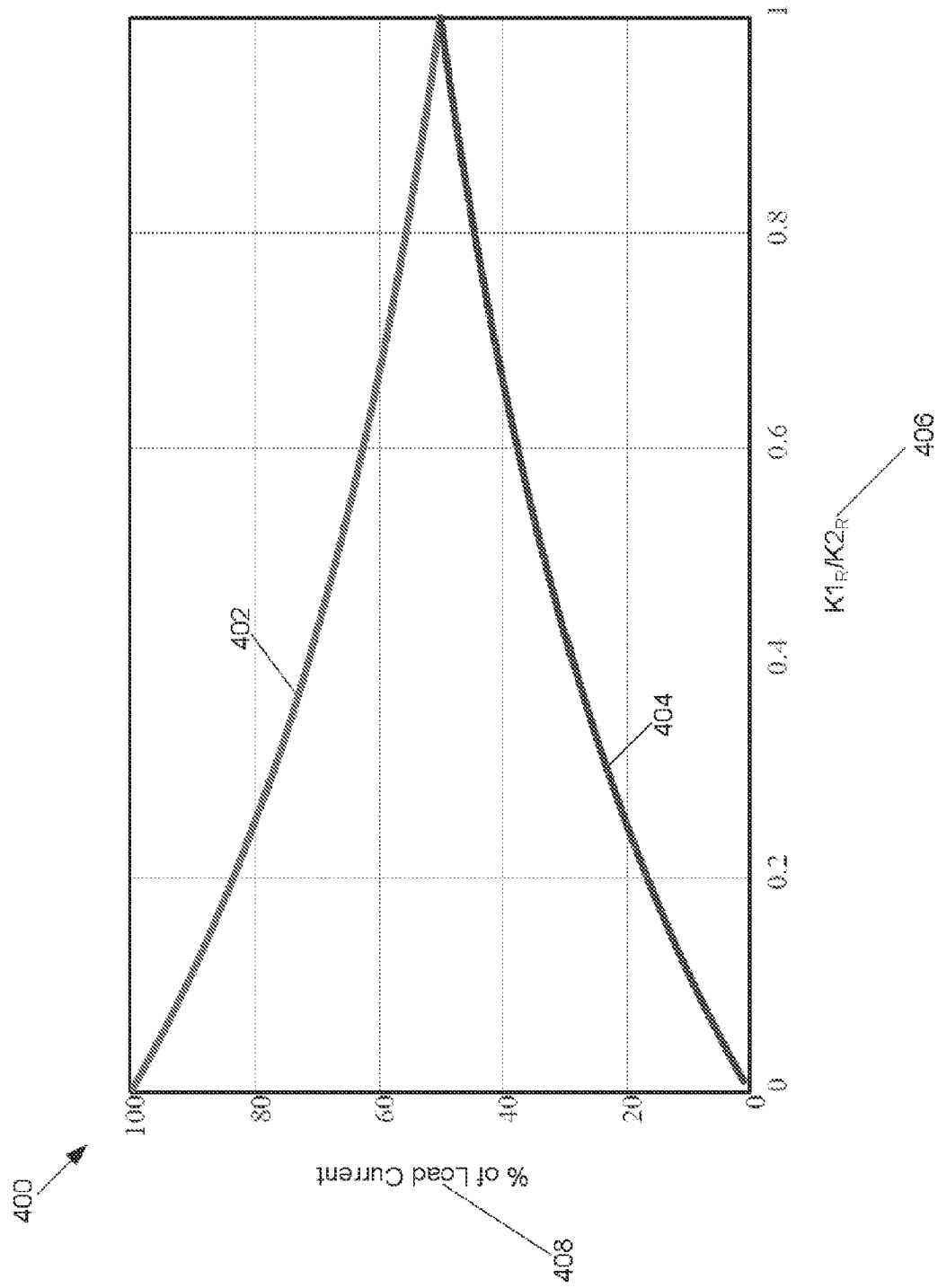
FIG. 4 is a graphical illustration of the load sharing of two inverters as a function of $K1_R/K2_R$ in accordance with aspects of the present invention.

A graphical representation 400 of the load sharing relationship between the first UPS 102 and the second UPS 202 as a function of $K1_R/K2_R$ is illustrated in FIG. 4. As shown in FIG. 4, a curve representing current $I_{INV1}$ 402 from the first UPS 102 and a curve representing current $I_{INV2}$ 404 from the second UPS 202 are shown. The x-axis 406 of the graph 400 represents the value of the ratio $K1_R/K2_R$ and the y-axis 408 of the graph 400 represents the percentage of total load current ($I_{Load}$) provided by each inverter 163, 263 in response to the $K1_R/K2_R$ ratio.

When ratio $K1_R/K2_R$ is one, both current $I_{INV1}$ from the first UPS 102 and current $I_{INV2}$ from the second UPS 202 provide fifty percent of the total load current ($I_{Load}$). When ratio $K1_R/K2_R$ is 1/2, the current $I_{INV1}$ from the first UPS 102 provides two thirds of the total load current ($I_{Load}$) and the current $I_{INV2}$ from the second UPS 202 provides one third of the total load current ($I_{Load}$). Finally, when ratio $K1_R/K2_R$ is 1/4, the current $I_{INV1}$ from the first UPS 102 provides three quarters of the total load current ($I_{Load}$) and the current $I_{INV2}$ from the second UPS 202 provides one quarter of the total load current ($I_{Load}$).

For example, if the first UPS 102 has a rating of 20 kW and the second UPS 202 has a rating of 10 kW (i.e. the current provided by the first UPS 102 should be twice as much as the current provided by the second UPS 202):

$$K1/K2=I_{INV2}/I_{INV1}=0.5;$$

$$I_{INV1}=I_{Load}*(1/((K1/K2)+1))=I_{Load}*2/3; \text{ and}$$

$$I_{INV2}=I_{Load}*(1/((K2/K1)+1))=I_{Load}*1/3.$$

By dynamically adjusting the $K1_R/K2_R$ ratio, the DSP 170, 270 configures the load sharing relationship of the first UPS 102 and second UPS 202 to compensate for differing UPS power ratings. Also, by configuring the load sharing between UPSs to account for varying power ratings between UPS's, the overloading of a UPS may be prevented and the efficiency and performance of the parallel UPS system may be increased.

The dynamic variable of a gain stage 180, 280 is defined, by the DSP 170, 270, in response to power capabilities of an input power source coupled to the corresponding UPS 102, 202. The DSP 170, 270 may adjust the dynamic variable of each gain stage 180, 280 to configure the load sharing relationship to compensate for changing input power source capabilities of each UPS. For example, if the first UPS 102 receives power from a solar panel and the second UPS 202 receives power from a generator, the DSP 170, 270 may adjust the dynamic variable of each gain stage 180, 280 to configure the load sharing relationship to compensate for different power capabilities (e.g., power ratings) of the two input sources. The DSP 170, 270 may also dynamically adjust the dynamic variable of each gain stage 180, 280 to compensate for changing power capabilities of the two input power sources (e.g., due to the impact of a cloudy day on the solar panel or the generator entering a low power mode).

In another example, if the first UPS 102 receives power from a first battery and the second UPS 202 receives power from a second battery having a lower capacity then the first battery, the DSP 170, 270 may adjust the dynamic variable of each gain stage 180, 280 to configure the load sharing relationship to compensate for the different battery capacities. In this way, the percentage of load current provided by the second battery may be configured to extend the runtime of the second battery, therefore preventing the second battery from becoming prematurely exhausted, leaving the first battery to individually power the load.

As described above, the DSP 170, 270 of each UPS 102, 202 may communicate with the other UPS coupled in parallel (e.g., via a CAN bus) to send information to the other UPS regarding its power capabilities and receive information regarding the other UPSs power capabilities. Based on the information it receives regarding the power capabilities of the other UPS coupled in parallel and information about the power capabilities of its own corresponding UPS, the DSP 170, 270 is able to accurately configure the dynamic variable of its associated gain stage 180, 280. This may consequently prevent the overloading of a UPS and increase the efficiency and performance of the parallel UPS system.

If two UPS's 102, 202 with the same power ratings are receiving input power from two sources with different power capabilities, only the dynamic variable of each gain factor need be adjusted to compensate load sharing between the UPS's on account of the differing input power characteristics. In such a situation the rating variables would equal one and would not affect the ratio K1/K2.

For example, in a parallel UPS system where similarly rated UPS's are receiving power from different input sources having different power characteristics:

$K1 = K1_R * K1_D$ and $K2 = K2_R * K2_D$;

$K1_R = K2_R = 1$;

$I_{INV1} = I_{Load} * (1/((K1_D/K2_D)+1))$; and $I_{INV2} = I_{Load} * (1/((K2_D/K1_D)+1))$.

The ratio $K1_D/K2_D$ (i.e. the ratio of dynamic variables) defines the load sharing relationship between the first UPS 102 and the second UPS 202 and the percentage of the total current provided by each inverter 163, 263 to the load.

Figure 5:
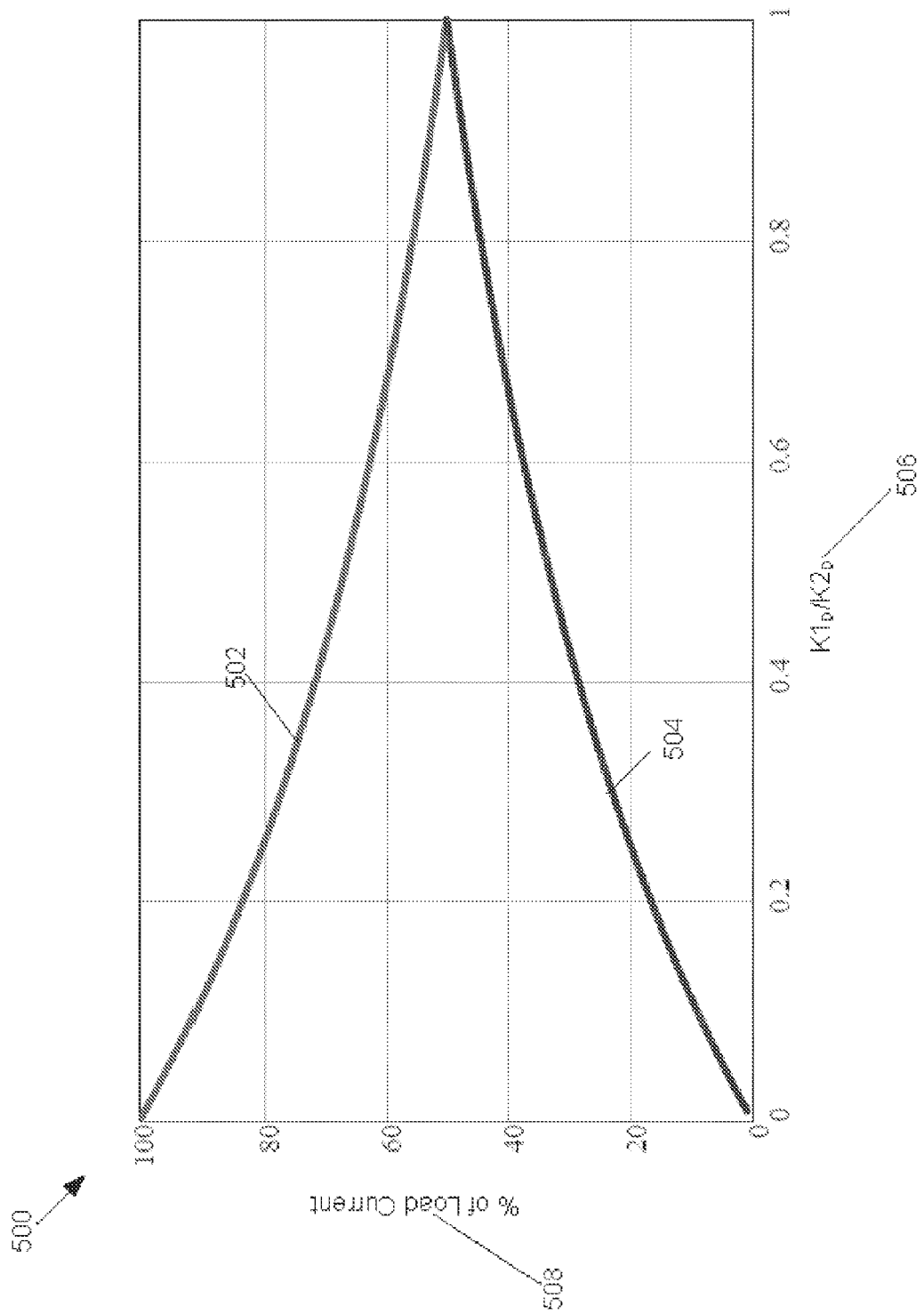
FIG. 5 is a graphical illustration of the load sharing of two inverters as a function of $K1_D/K2_D$ in relation to a first $K1_R/K2_R$ ratio in accordance with aspects of the present invention.

A graphical representation 500 of the load sharing relationship between the first UPS 102 and the second UPS 202 as a function of $K1_D/K2_D$ is illustrated in FIG. 5. As shown in FIG. 5, a curve representing current $I_{INV1}$ 502 from the first UPS 102 and a curve representing current $I_{INV2}$ 504 from the second UPS 202 are shown. The x-axis 506 of the graph 500 represents the value of the ratio $K1_D/K2_D$ and the y-axis 508 of the graph 400 represents the percentage of total load current ($I_{Load}$) provided by each inverter 163, 263 in response to the $K1_D/K2_D$ ratio.

When ratio $K1_D/K2_D$ is one, both current $I_{INV1}$ from the first UPS 102 and current $I_{INV2}$ from the second UPS 202 provide fifty percent of the total load current ($I_{Load}$). When ratio $K1_D/K2_D$ is 1/2, the current $I_{INV1}$ from the first UPS 102 provides two thirds of the total load current ($I_{Load}$) and the current $I_{INV2}$ from the second UPS 202 provides one third of the total load current ($I_{Load}$). Finally, when ratio $K1_D/K2_D$ is 1/4, the current $I_{INV1}$ from the first UPS 102 provides three quarters of the total load current ($I_{Load}$) and the current $I_{INV2}$ from the second UPS 202 provides one quarter of the total load current ($I_{Load}$).

For example, if the first UPS 102 is receiving power from an input power source capable of providing 60 percent of the total load share (e.g., due to a higher rated power source or a higher capacity battery) and the second UPS 202 is receiving power from an input power source only capable of providing 40 percent of the total load share (e.g. due to negative environmental conditions or a lower capacity battery):

$K1_D/K2_D = I_{INV2}/I_{INV1} = 100/(\% \text{ Load Share by } I_{INV1}) - 1 = 2/3$;

$I_{INV1} = I_{Load} * (1/((K1_D/K2_D)+1)) = I_{Load} * 60\%$; and $I_{INV2} = I_{Load} * (1/((K2_D/K1_D)+1)) = I_{Load} * 40\%$.

By dynamically adjusting the $K1_D/K2_D$ ratio, the DSP 170, 270 configures the load sharing relationship of the first UPS 102 and second UPS 202 to compensate for differing input power source capabilities.

According to some embodiments, a parallel UPS system may include UPS's having both different power ratings and also different input power sources with different capabilities. In such an example, both the rating variable and the dynamic variable of each gain stage is adjusted to compensate the load sharing to account for the differing power ratings and input power source capabilities.

For example, in a parallel UPS system where two UPS's with different power ratings are receiving power from input sources having different input power capabilities:

$K1 = K1_R * K1_D$ and $K2 = K2 * K2_D$;

$K_T = (K1_R * K1_D)/(K2_R * K2_D)$;

$I_{INV1} = I_{Load} * (1/(((K1_R * K1_D)/(K2_R * K2_D))+1))$;

$I_{INV2} = I_{Load} * (1/(((K2_R * K2_D)/(K1_R * K1_D))+1))$;

$I_{INV1} = I_{Load} * 1/(K_T + 1)$;

$I_{INV2} = I_{Load} * 1(1/K_T + 1)$;

The ratio $K_T$ (i.e. the total gain stage ratio including rating and dynamic variables) defines the load sharing relationship between the first UPS 102 and the second UPS 202 and the percentage of the total current provided by each inverter 163, 263 to the load in response to different power ratings and input power capabilities of each UPS.

According to one embodiment, as the rating variables of each gain stage 180, 280 are based on design characteristics of each UPS, the rating variables are fixed and each DSP 170, 270 may adjust the ratio $K_T$ by adjusting the ratio of dynamic variables (i.e. $K1_D/K2_D$) of each gain stage 180, 280, to achieve the desired load sharing in light of the different power ratings and input power source capabilities.

Figure 6:
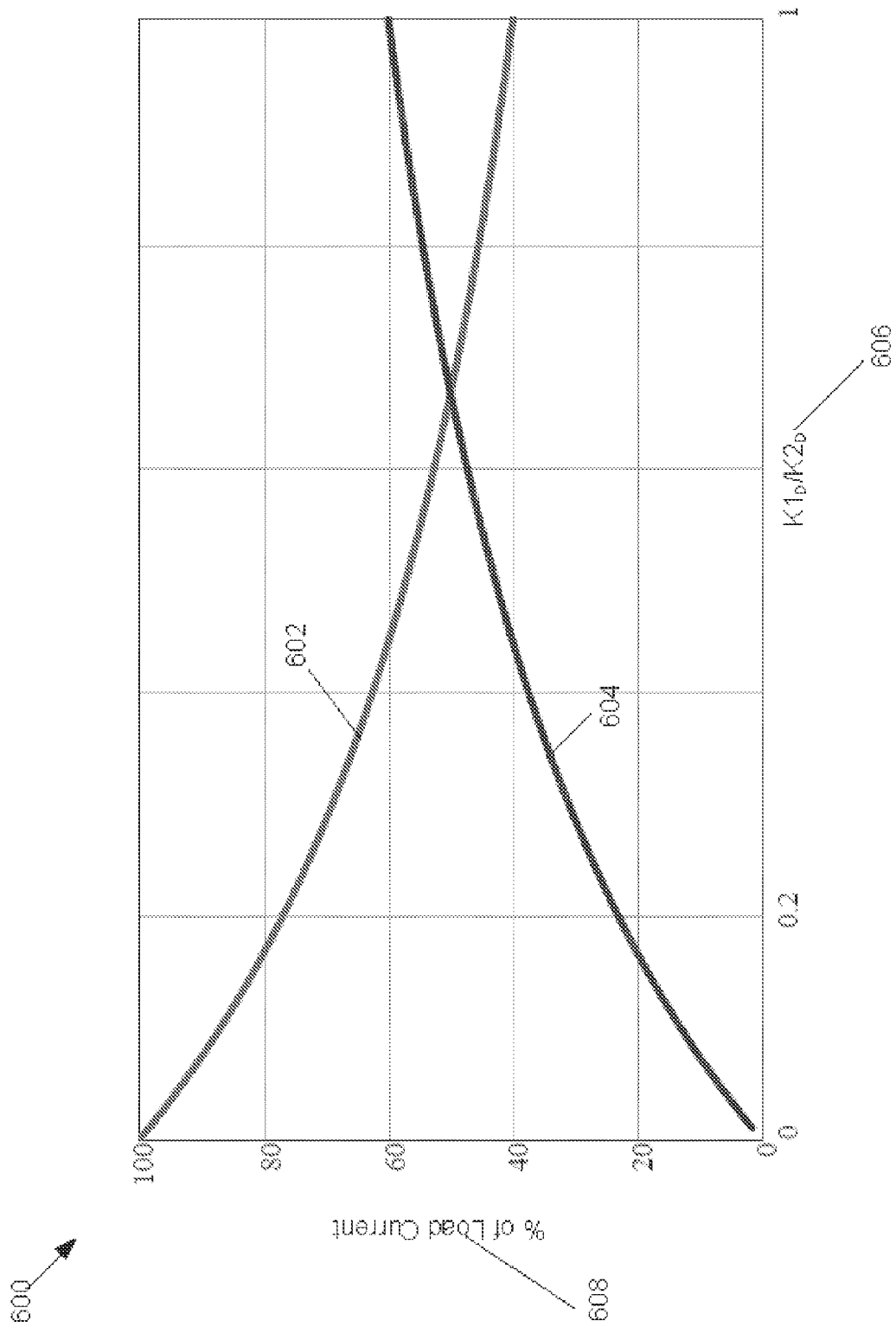
FIG. 6 is graphical illustration of the load sharing of two inverters as a function of $K1_D/K2_D$ in relation to a second $K1_R/K2_R$ ratio in accordance with aspects of the present invention.

A graphical representation 600 of the load sharing relationship between the first UPS 102 and the second UPS 202 as a function of $K1_D/K2_D$ is illustrated in FIG. 6. The graphical representation 600 assumes a rating variable ratio (i.e. $K1_R/K2_R$) of 1.5. As discussed above, when compensating for varying power ratings and varying input power source capabilities, the DSP 170, 270 adjusts the dynamic variable of each gain stage 180, 280 to adjust the total gain stage ratio $K_T$ (and hence the load sharing between UPS's) appropriately. As seen in FIG. 6, a curve representing current $I_{INV1}$ 602 from the first UPS 102 and a curve representing current $I_{INV2}$ 604 from the second UPS 202 are shown. The x-axis 606 of the graph 600 represents the value of the ratio $K1_D/K2_D$ and the y-axis 608 of the graph 600 represents the percentage of total load current ($I_{Load}$) provided by each inverter 163, 263 in response to the $K1_D/K2_D$ ratio.

Figure 7:
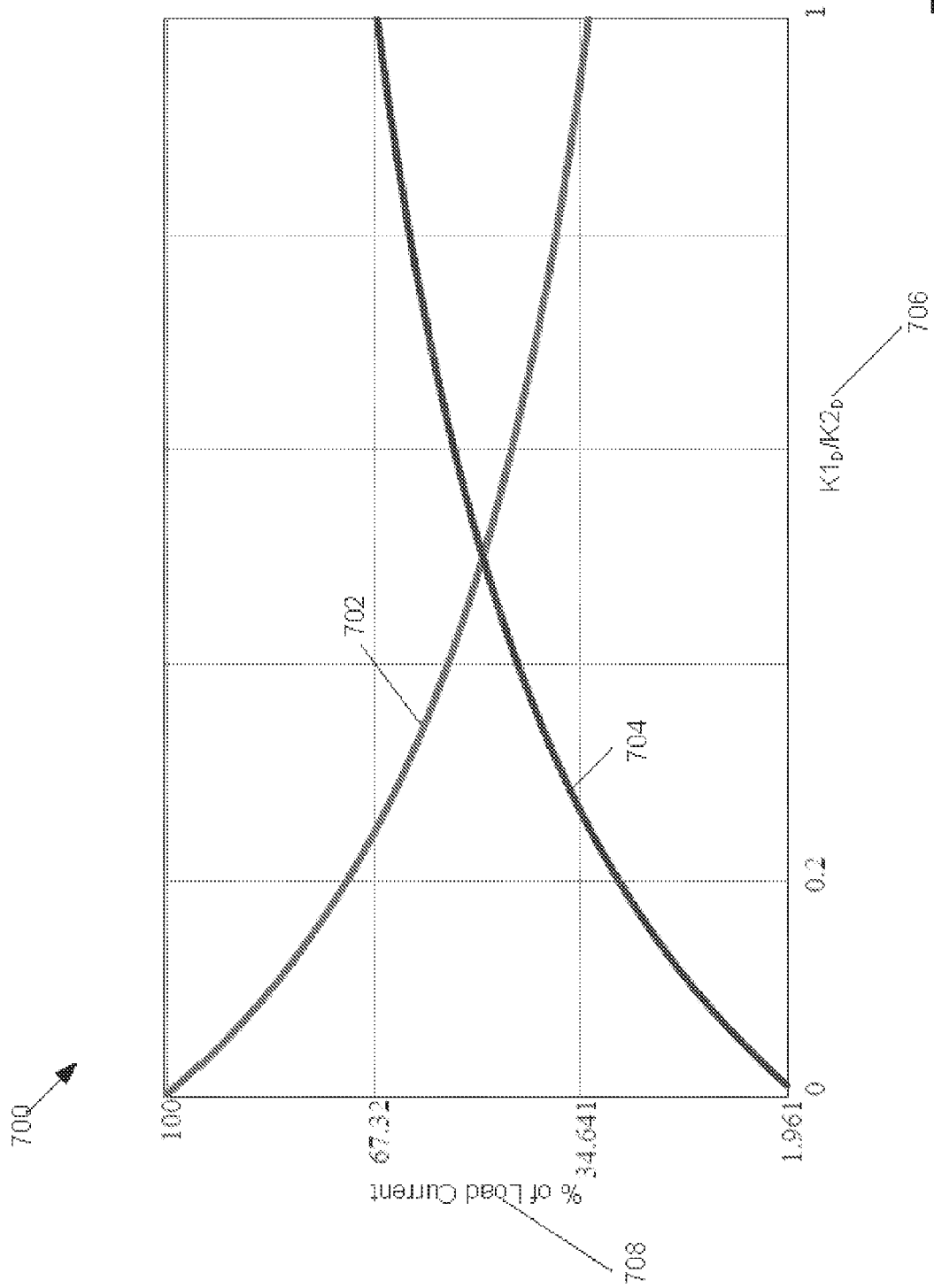
FIG. 7 is a graphical illustration of the load sharing of two inverters as a function of $K1_D/K2_D$ in relation to the total gain stage ratio $K_T$ in accordance with aspects of the present invention.

A graphical representation 700 of the load sharing relationship between the first UPS 102 and the second UPS 202 as a function of $K1_D/K2_D$ is also illustrated in FIG. 7. The graphical representation 700 assumes a rating variable ratio (i.e. $K1_R/K2_R$) of 2. As discussed above, when compensating for varying power ratings and varying input power source capabilities, the DSP 170, 270 adjusts the dynamic variable of each gain stage 180, 280 to adjust the total gain stage ratio $K_T$ (and hence the load sharing between UPS's) appropriately. As seen in FIG. 7, a curve representing current $I_{INV1}$ 702 from the first UPS 102 and a curve representing current $I_{INV2}$ 704 from the second UPS 202 are shown. The x-axis 706 of the graph 600 represents the value of the ratio $K1_D/K2_D$ and the y-axis 708 of the graph 600 represents the percentage of total load current ($I_{Load}$) provided by each inverter 163, 263 in response to the $K1_D/K2_D$ ratio.

When ratio $K1_D/K2_D$ is one and ratio $K1_R/K2_R$ is 1.5, the current $I_{INV1}$ from the first UPS 102 provides forty percent of the total load current ($I_{Load}$) and the current $I_{INV2}$ from the second UPS 202 provides sixty percent of the total load current ($I_{Load}$). When ratio $K1_D/K2_D$ is one and ratio $K1_R/K2_R$ is 2, the current $I_{INV1}$ from the first UPS 102 provides one third of the total load current ($I_{Load}$) and the current $I_{INV2}$ from the second UPS 202 provides two thirds of the total load current ($I_{Load}$).

For example, where the first UPS 102 has a 20 kW rating and is coupled to an input power source capable of providing 60 percent of the total load share, and the second UPS 202 has a 10 kW rating and is coupled to an imputer power source capable of providing 40 percent of the total load share:

$$K1_R/K2_R=0.5;$$

$$K1_D/K2_D=2/3;$$

$$I_{INV1}=I_{Load}*(1/(((K1_R*K1_D)/(K2_R*K2_D))+1))=\tfrac{3}{4}*I_{Load};$$

$$I_{INV2}=I_{Load}*(1/(((K2_R*K2_D)/(K1_R*K1_D))+1))=\tfrac{1}{4}*I_{Load};$$

Taking into account both the different power ratings and different input power capabilities, each gain stage can be defined to provide appropriate load sharing between UPS's. More specifically, by dynamically adjusting the $K1_D/K2_D$ ratio, the DSP 170, 270 can configure the load sharing relationship of the first UPS 102 and second UPS 202 to compensate for the differing power ratings and differing input power source capabilities.

Even though examples in accordance with the present invention are described herein with reference to a jumper-sense signal based master/control determination system, other examples may utilize a different master/control determination system (e.g., a CAN bus based system).

Also, even though examples in accordance with the present invention are described herein with reference to the use of one or two UPS's 102, 202 in a parallel UPS system 100, other examples may utilize more than two UPS's coupled together in parallel.

In addition, even though examples in accordance with the present invention are described herein in reference to Uninterruptible Power Supplies (UPS), other examples may be utilized with any type of parallel power system in which dual power sources are coupled together. It also is to be appreciated that examples in accordance with the present invention may be utilized to monitor any type (e.g., commercial or residential) or size system.

By providing a parallel UPS system capable of dynamically adjusting the load sharing of each UPS in the parallel UPS system based on each UPS's power rating, available battery capacity and/or the power capabilities of each UPS's input power source, the parallel UPS system is able to better delegate load sharing responsibilities amongst UPS's in a parallel UPS system to improve efficiency of the system, to improve performance of the system, and to prevent unanticipated breakdowns of the system.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of operating a UPS system having a first UPS and a second UPS, the method comprising:
   powering on the first UPS;
   receiving power from a first input power source coupled to an input of the first UPS;
   providing power to a load coupled to an output of the first UPS;
   receiving, by the first UPS, a signal indicative of at least one of a power rating of the second UPS and power capabilities of a second input power source providing power to the second UPS; and
   adjusting the power provided to the load by the first UPS in response to power characteristics of the first UPS and the at least one of the power rating of the second UPS and the power capabilities of the second input power source indicated in the received signal.

2. The method of claim 1, wherein adjusting the power provided to the load by the first UPS comprises adjusting a gain factor of the first UPS.

3. The method of claim 2, further comprising adjusting the gain factor based on power ratings of the first UPS and the second UPS.

4. The method of claim 2, further comprising adjusting the gain factor based on power capabilities of the first input power source and the power capabilities of the second input power source providing power to the second UPS.

5. The method of claim 4, wherein the first input power source is a battery having a capacity, and wherein adjusting the gain factor based on power capabilities comprises adjusting the gain factor based on the capacity of the battery.

6. The method of claim 4, wherein the first input power source is a renewable energy source, and wherein adjusting the gain factor based on power capabilities comprises dynamically adjusting the gain factor based on changing power capabilities of the renewable energy source.

7. The method of claim 2, further comprising:
   adjusting the gain factor based on power ratings of the first and second UPS; and adjusting the gain factor based on power capabilities of the first input power source and the second input power source providing power to the second UPS.

8. The method of claim 7, wherein adjusting the gain factor based on the power ratings of the first UPS and the second UPS comprises adjusting a rating variable portion of the gain factor based on the power ratings of the first UPS and the second UPS.

9. The method of claim 7, wherein adjusting the gain factor based on the power capabilities of the first and second input power sources comprises adjusting a dynamic variable portion of the gain factor based on the power capabilities of the first UPS and the second UPS.

10. A UPS comprising:
an input configured to receive input power from a first input power source;
an output configured to provide output power to a load, the output power having an output current;
a controllable gain stage coupled to the output and configured to adjust a gain factor of the UPS to adjust output current; and
control circuitry coupled to the controllable gain stage and configured to adjust the gain factor of the gain stage based on power characteristics of the UPS and based on an input signal indicative of at least one of a power rating of a second UPS also providing power to the load and power capabilities of a second input power source providing power to the second UPS.

11. The UPS of claim 10, wherein the gain factor of the gain stage is comprised of a rating variable portion and a dynamic variable portion.

12. The UPS of claim 11, wherein the control circuitry is configured to adjust the rating variable portion of the gain factor based on a power rating of the UPS.

13. The UPS of claim 11, wherein the control circuitry is configured to adjust the dynamic variable portion of the gain factor based on power capabilities of the first input power source.

14. The UPS of claim 13, wherein the input is configured to be coupled to a battery and wherein the control circuitry is configured to adjust the dynamic variable portion of the gain factor based on a capacity of the battery.

15. The UPS of claim 13, wherein the input is configured to be coupled to a renewable energy source and wherein the control circuitry is configured to dynamically adjust the dynamic variable portion of the gain factor based on changing capabilities of the renewable energy source.

16. The UPS of claim 10, further comprising:
an inverter configured to be coupled to the first input power source and the output and to regulate input power from the first input power source and provide regulated power to the output;
a feedback loop coupled between the output and the gain stage; and
a current error amplifier coupled between the gain stage and the inverter,
wherein the current error amplifier is configured to provide control signals to the inverter based on a comparison between a current reference signal and an inverter current sense signal provided to the gain stage via the feedback loop and adjusted by the gain factor of the gain stage.

17. A UPS system comprising:
a first UPS and a second UPS, each of the first UPS and the second UPS including:
an input configured to receive input power from an input power source;
an output configured to provide output power to a load, the output power having an output current;
a controllable gain stage coupled to the output and configured to adjust the output current by a gain factor; and
control circuitry coupled to the controllable gain stage;
wherein the control circuitry of the first UPS is configured to adjust the gain factor of the gain stage of the first UPS in response to power characteristics of the first UPS and a signal indicative of at least one of a power rating of the second UPS and power capabilities of the input power source providing power to the second UPS; and
wherein the control circuitry of the second UPS is configured to adjust the gain factor of the gain stage of the second UPS in response to power characteristics of the second UPS and a signal indicative of at least one of a power rating of the first UPS and power capabilities of the input power source providing power to the first UPS.

18. The UPS system of claim 17, wherein the outputs of each UPS are coupled in parallel to the load and the output current of each UPS is combined to provide a total output current to the load, and
wherein, by adjusting a ratio of the first UPS's gain factor to the second UPS's gain factor, the control circuitry of each UPS is further configured to adjust a percentage of total load current provided by each one of the UPS's.

19. The UPS system of claim 17, wherein the gain factor of each UPS comprises a rating variable portion which is defined based on the power ratings of the first and the second UPS.

20. The UPS system of claim 17, wherein the gain factor of each UPS comprises a dynamic variable portion which is defined based on power capabilities of the input power source providing input power to the first UPS and the input power source providing input power to the second UPS.

* * * * *